United States Patent
Stevenson

(10) Patent No.: US 6,866,318 B1
(45) Date of Patent: Mar. 15, 2005

(54) BEVERAGE CONTAINER HOLDER FOR VEHICLES

(75) Inventor: Robin Stevenson, Bloomfield, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/724,911

(22) Filed: Dec. 1, 2003

(51) Int. Cl.⁷ .................................................. B60R 7/06
(52) U.S. Cl. ................. 296/37.12; 224/926; 224/545; 248/311.2; 165/41; 62/244
(58) Field of Search .................. 296/37.12, 208, 296/70; 224/926, 545, 549; 248/311.2; 165/41, 80.1; 62/244

(56) References Cited

U.S. PATENT DOCUMENTS

| | | | |
|---|---|---|---|
| 4,852,843 A | 8/1989 | Chandler | 248/311.2 |
| 5,165,646 A | 11/1992 | Gewecke | 248/311.2 |
| 5,489,055 A | 2/1996 | Levy | 224/544 |
| 5,540,409 A | 7/1996 | Cunningham | 248/311.2 |
| 5,865,411 A | 2/1999 | Droste et al. | 248/311.2 |
| 5,913,452 A * | 6/1999 | Weigl | 220/737 |
| D413,563 S | 9/1999 | Gravenstreter | D12/419 |
| D444,683 S | 7/2001 | Corrion | D7/701 |
| 6,253,975 B1 | 7/2001 | Ichioka et al. | 224/281 |
| 6,361,008 B1 | 3/2002 | Gravenstreter | 248/311.2 |
| 6,533,232 B1 | 3/2003 | Aggeler | 248/311.2 |
| 6,550,736 B2 | 4/2003 | Schaal | 248/311.2 |
| 6,560,983 B1 | 5/2003 | Schimmeyer | 62/244 |
| 2002/0179282 A1 * | 12/2002 | Kutzner | 165/41 |

* cited by examiner

Primary Examiner—Joseph D. Pape
(74) Attorney, Agent, or Firm—Kathryn A. Marra

(57) ABSTRACT

A beverage container holder for a vehicle is disclosed. The holder includes an air vent portion, and a beverage container support portion movably but not removably disposed at the vent portion. The support portion has a first position arranged to permit air passage through the vent portion and the support portion in the absence of a beverage container, and a second position arranged to permit air passage through the vent portion and to hold a beverage container.

20 Claims, 2 Drawing Sheets

BEVERAGE CONTAINER HOLDER FOR VEHICLES

BACKGROUND OF THE INVENTION

The present disclosure relates generally to a beverage container holder for a vehicle, and particularly to a beverage container holder conveniently disposed within a vehicle.

Beverage container holders are used in automobiles for the benefit and convenience of the occupants. However, not all holders are conveniently located, and some vehicles are not equipped with factory installed holders at all and therefore require an aftermarket purchase. Beverage container holders located at a center console may be convenient in an automobile with an automatic transmission, but may not be convenient in an automobile with a standard transmission, and beverage container holders that are aftermarket purchases having attachment mechanisms for ashtrays, glove boxes, or air vent louvers, may be conveniently located when in use, but may not be readily attachable, detachable, or stowable.

Accordingly, there is a need in the art for a beverage container holder for a vehicle that overcomes these drawbacks.

SUMMARY OF THE INVENTION

In one embodiment, a beverage container holder for a vehicle is disclosed. The holder includes an air vent portion, and a beverage container support portion movably but not removably disposed at the vent portion. The support portion has a first position arranged to permit air passage through the vent portion and the support portion in the absence of a beverage container, and a second position arranged to permit air passage through the vent portion and to hold a beverage container.

In another embodiment, a beverage container holder for a vehicle is disclosed. The holder includes an air vent portion, and a beverage container support portion movably but not removably disposed at the vent portion. The support portion has a first position arranged to permit air passage through the vent portion in the absence of a beverage container, and a second position arranged to permit air passage through the vent portion and to hold a beverage container. In the first position, the support portion is adapted to be retracted into a surface of the vehicle proximate the vent portion, and in the second position, the support portion is adapted to be extended from the surface.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a beverage container holder for a vehicle where the holder is disposed at and arranged integral with an air vent at a surface of the vehicle. While embodiments described herein depict a dashboard as an exemplary surface of the vehicle, it will be appreciated that other vehicle surfaces may be employed for implementing embodiments of the invention, such as a door, a side panel, an instrument panel, or a console, for example. While embodiments described herein depict an integrally arranged beverage container holder and air vent at a surface of the vehicle, it will be appreciated that the integrally arranged beverage container holder and air vent may be assembled separate from and subsequently arranged at the vehicle surface. While embodiments described herein depict a cup as an exemplary beverage container, it will be appreciated that the disclosed invention may also be applicable to other beverage containers, such as a mug, a can, or a bottle, for example.

Figure 1:
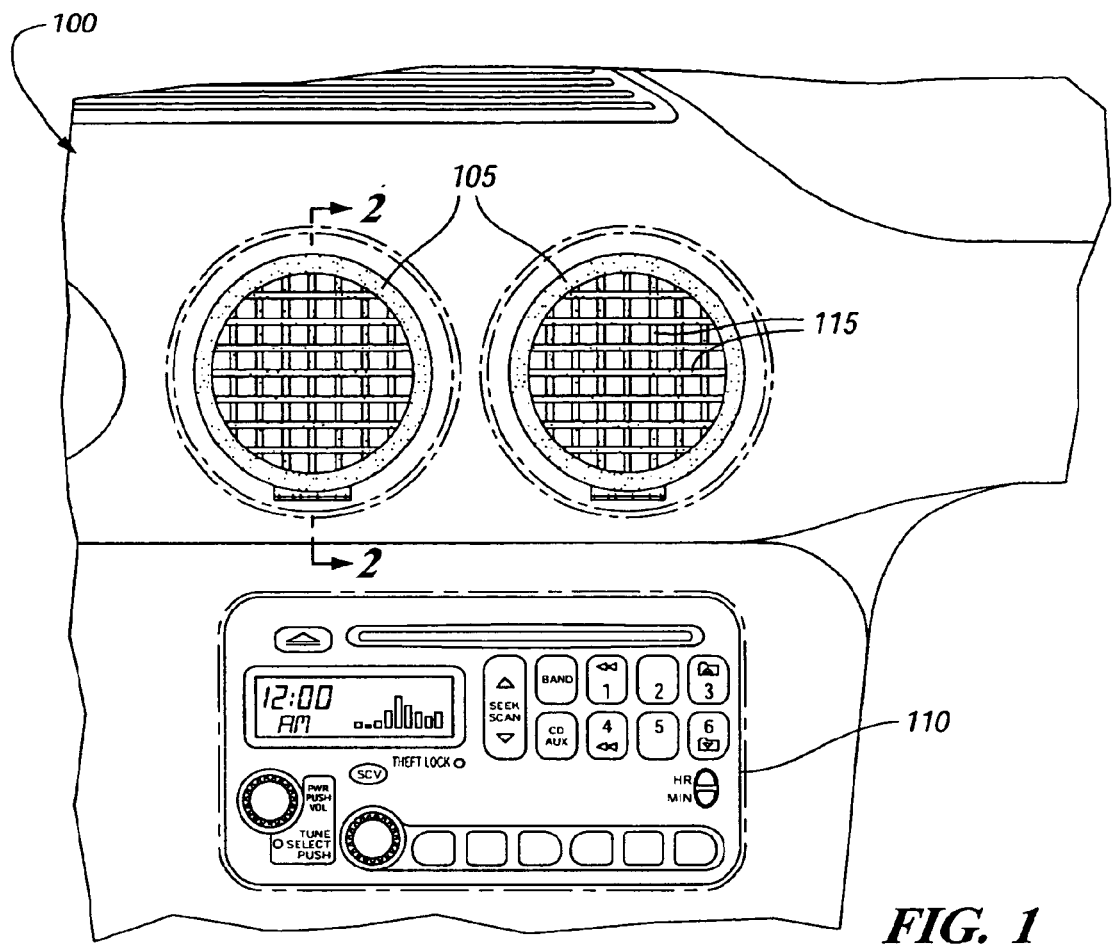
FIG. 1 depicts a front view of an exemplary dashboard of a vehicle incorporating an embodiment of the invention.
Figure 2:
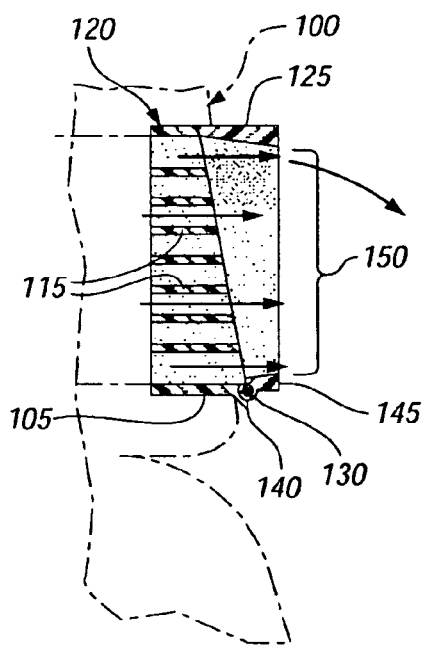
FIG. 2 depicts a section side view of an embodiment of the invention in a first position.
Figure 3:
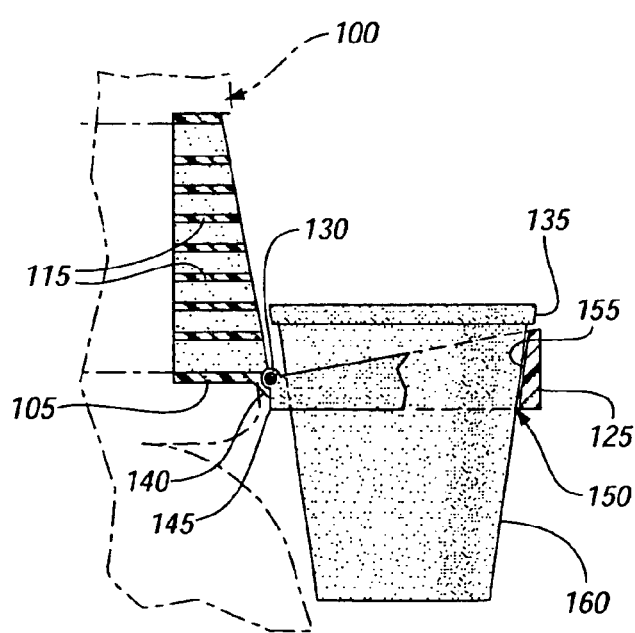
FIG. 3 depicts a partial section side view of the embodiment of FIG. 2 in a second position.
Figure 5:
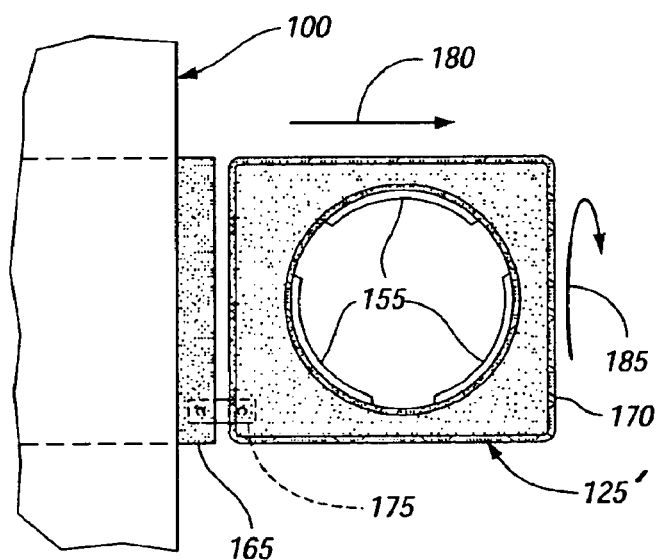
FIG. 5 depicts a side view of the embodiment of FIG. 4 in an intermediate position.

FIG. 1 is an exemplary embodiment of a dashboard 100 for a vehicle (not shown) having an air vent 105 and a radio 110, depicted in front view orientation. In an embodiment, air vent 105 includes horizontal and vertical louvers 115 that may be adjusted horizontally and vertically for controlling the flow of air from air vent 105 into the passenger compartment of the vehicle. A side view section cut through air vent 105 and dashboard 100 is depicted in FIG. 2, which shows air vent 105 to be one portion of a beverage container holder 120. Another portion of holder 120 is a beverage container support 125, which is movably but not removably disposed at vent 105 via a hinge 130. Support 125 has a first position (closed), depicted in FIG. 2, that permits air passage through vent 105 and support 125 in the absence of a beverage container, and a second position (open), depicted in FIG. 3, that permits air passage through vent 105 and holds a beverage container 135. In the closed position, support 125 is held in place via a snug fit, a press fit, a snap fit, or by any other suitable means, with respect to vent 105, such that support 125 stays in the closed position when not in use. In the open position, a stop surface 140 at hinge 130 engages with an edge 145 of support 125 to orient support 0.125 in the open position. Hinge 130, stop surface 140, edge 145, and support 125, are configured sufficient to hold the weight of beverage container 135 when containing a beverage. Referring now to FIG. 3, where support 125 has been pivoted downward from the closed position to the open position, support 125 has an opening 150 and an inner surface 155 for receiving and holding container 135. In an embodiment, surface 155 is tapered inward from top to bottom so as to snugly engage with an outer surface 160 of container 135. Opening 150 of support 125 is appropriately sized to accept a typical beverage container 135. In an embodiment, inner surface 155 that defines opening 150 may be a continuous surface, a series of surfaces defined by ribs, or any combination of continuous or non-continuous surfaces or series of surfaces suitable for holding container 135 (as seen in FIG. 5). In the closed position, depicted in FIG. 2, opening 150 permits air passage from vent 105 to pass into the passenger compartment of the vehicle. In either the closed or the open position, louvers 115 are accessible and adjustable in both the horizontal and vertical directions, which is made possible as a result of support 125 having a pivot 130 and being absent direct engagement with louvers 115.

While an embodiment of the invention has been depicted with a bottom hinge 130 arrangement for a fold-down holder configuration, it will be appreciated that other hinge orientations may be possible, such as a top hinge or a side hinge for a fold-up or a fold-sideways holder configuration, for example. Where a top hinge or a side hinge arrangement is employed, it will be appreciated that a latching arrangement may be incorporated into vent 105 or dashboard 100 for retaining support 125 in the open position.

Additionally, while vent 105 is depicted in the front view of FIG. 1 as being generally circular in shape, it will be appreciated that vent 105 may be of any shape, such as rectangular or semi-circular for example, with opening 150 and surface 155 being configured for receiving and holding container 135.

Figure 4:
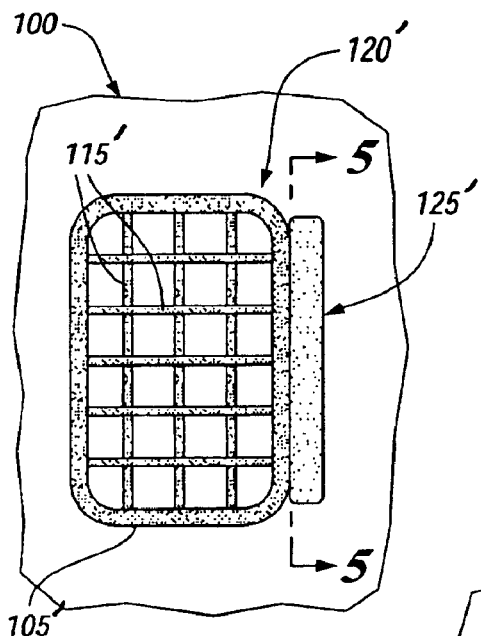
FIG. 4 depicts a front view of an alternative embodiment to that of FIG. 1, the alternative embodiment in a first position.
Figure 6:
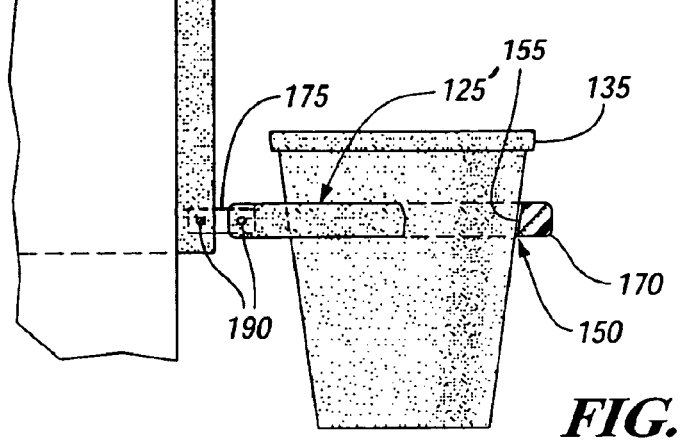
FIG. 6 depicts a partial section side view of the embodiment of FIG. 4 in a second position.

In an alternative embodiment, and referring now to FIGS. 4–6, beverage container holder 120' includes vent 105' and support 125', where support 125' is bifurcated into a first part 165 and a second part 170 with a swivel joint 175 therebetween. Here, support 125' has a first position (closed) where support 125' is retracted into dashboard 100 proximate a side of vent 105' and aligned with the HVAC (heating ventilation air conditioning) plenum opening (see FIG. 4), a second position (open) where support 125' is extended from dashboard 100 and second part 170 is swiveled horizontally to receive and hold container 135 (see FIG. 6), and an intermediate position where support 125' is extended from dashboard 100 and second part 170 is oriented in alignment with first part 165 prior to being swiveled horizontally (see FIG. 5). In the closed position depicted in FIG. 4, support 125' is arranged so as to minimize disruption to or blockage of airflow to downstream vents. To move support 125' from the first position to the second position, first and second parts 165, 170 are first translated out of dashboard 100 in the direction of arrow 180 to the intermediate position, and then second part 170 is rotated with respect to first part 165 about swivel joint 175 in the direction of arrow 185. A set of stops or detents 190, such as provided by locking pins or spring loaded ball bearings in recesses for example, may be used to maintain second part 170 in an appropriate orientation for holding container 135 when support 125' is in the second position. In an embodiment, the moment created by the weight of container 135 in support 125' about swivel joint 175 is such that support 125' is driven against stops 190 when in the second position, thereby holding container 135 in a favorable orientation. In the extended second position, first part 165 extends back into dashboard 100 and is suitably arranged with dashboard 100 for supporting the weight of container 135 having a beverage therein. Second part 170 includes opening 150 and surface 155 for receiving and holding container 135, in a manner similar to that discussed earlier.

While the embodiment of FIGS. 4–6 is depicted having first and second portions 165, 170 of support 125' disposed at a vertical side of vent 105', it will be appreciated that support 125' may be disposed at any side, vertical or horizontal, of vent 105'. If support 125' is disposed at a horizontal side of vent 105' then swivel joint 175 may be omitted, thereby resulting in an arrangement where support 125' may simply be translated in the direction of arrow 180 from the first position (closed or retracted) to the second position (open or in a position to receive container 135). In the closed position in the absence of container 135, and in the open position in the presence of container 135, air is permitted to pass through vent 105', and louvers 115' are adjustable in both horizontal and vertical directions, in a manner similar to that discussed earlier.

In the embodiment of FIGS. 1–3 and the alternative embodiment of FIGS. 4–6, support 125, 125' is seen to be movably but not removably arranged with respect to vent 105, 105', thereby resulting in a beverage container holder 120, 120' that is integrally arranged with dashboard 100.

As disclosed, some embodiments of the invention may include some of the following advantages: a readily accessible beverage container holder located in an area of the vehicle having high real estate value; a beverage container holder in an ergonomically desirable location; dashboard real estate providing the dual function of an air vent and a beverage container holder; fully adjustable air vent louvers in the presence or absence of a beverage container in the holder; a beverage container holder having minimal impact on air flow at an air vent; and, a beverage container holder that may be aesthetically stowed when not in use.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A beverage container holder for a vehicle, the holder comprising:

an air vent portion; and a beverage container support portion movably but not removably disposed at the vent portion;

wherein the support portion has a first position and a second position, the first position arranged to permit air passage through the vent portion and the support portion in the absence of a beverage container, the second position arranged to permit air passage through the vent portion and to hold a beverage container.

2. The holder of claim 1, wherein:

the support portion includes an opening and a surface arranged to receive and hold the beverage container.

3. The holder of claim 2, wherein the surface is tapered.

4. The holder of claim 2, wherein the surface is a continuous or non-continuous surface.

5. The holder of claim 1, wherein the vent portion and the support portion are hinged at one side.

6. The holder of claim 5, wherein the hinge side includes a stop surface arranged to engage with and orient the support portion in the second position.

7. The holder of claim 5, wherein the hinge side is at the bottom side of the vent portion and the support portion, such that the support portion pivots downward from the first position to the second position.

8. The holder of claim 1, wherein the vent portion further comprises louvers, the louvers being adjustable with the support portion in the first position and in the absence of a beverage container.

9. The holder of claim 8, wherein the louvers are adjustable with the support portion in the second position and in the presence of a beverage container.

10. The holder of claim 9, wherein the louvers are adjustable in both horizontal and vertical directions.

11. The holder of claim 9, wherein the support portion is absent engagement with the louvers.

12. A beverage container holder for a vehicle, the holder comprising:

an air vent portion; and a beverage container support portion movably but not removably disposed at the vent portion;

wherein the support portion has a first position and a second position, the first position arranged to permit air passage through the vent portion in the absence of a beverage container, the second position arranged to permit air passage through the vent portion and to hold a beverage container;

wherein the first position is such that the support portion is adapted to be retracted into a surface of the vehicle proximate the vent portion, and the second position is such that the support portion is adapted to be extended from the surface.

13. The holder of claim 12, wherein the support portion further comprises an intermediate position between the first and the second positions, such that the support portion is translated from the first position to the intermediate position and rotated from the intermediate position to the second position.

14. The holder of claim 12, wherein the support portion is disposed at a side of the vent portion.

15. The holder of claim 12, wherein the support portion includes an opening and a surface arranged to receive and hold the beverage container.

16. The holder of claim 15, wherein the surface is tapered.

17. The holder of claim 12, wherein the vent portion further comprises louvers, the louvers being adjustable with the support portion in the first position and in the absence of a beverage container.

18. The holder of claim 17, wherein the louvers are adjustable with the support portion in the second position and in the presence of a beverage container.

19. The holder of claim 18, wherein the louvers are adjustable in both horizontal and vertical directions.

20. The holder of claim 18, wherein the support portion is absent engagement with the louvers.

* * * * *